3,478,064
1,5-BIS-(SUBSTITUTED ALKYLAMINO)-ANTHRAQUINONES

Warren E. Solodar and Basil M. Kyriakakis, Rochester, N.Y., assignors to Xerox Corporation, Rochester, N.Y., a corporation of New York
No Drawing. Filed June 28, 1965, Ser. No. 468,192
Int. Cl. C07d *31/24;* C07c *49/68;* C09b *1/32*
U.S. Cl. 260—378                              2 Claims This invention relates to new compositions and to their manufacture and use. It is particularly directed to new pigments which have an intense color, ranging from red through magenta to purple.

Many magenta pigments, both organic and inorganic, are known and used in the prior art. While the known pigments are generally useful, the individual pigments generally have different specific undesirable characteristics. Inorganic pigments, as a class, generally exhibit high resistance to light, water, alcohol, and oils, but have poor dispersing properties. Organic pigments, while generally higher in cost and lower in resistance to degrading influences, generally have dispersing and working characteristics and color qualities superior to inorganic pigments. A great many organic red-magenta pigments are known. The following pigments are typical. Anthracene pigments are generally very resistant to the influence of light, heat, acids and alkalies, but they tend to bleed in alcohol and are expensive. Beta-oxy-naphthoic pigments are resistant to light, acid, alkalies, and oils but have an especially hard texture and are difficult to disperse in carriers. Triphenylmethane dyestuffs have brilliant, clean colors, but are very unstable. They often bleed in water and alcohol and have low resistance to acids and alkalies. Helio Bordeaux type pigments have high light and heat fastness but bleed in many organic solvents. Indanthrene pigments lack brilliance and tinctorial strength, but are among the most permanent pigments known. They are available in an especially wide range of hues. Lithol Reds have good tinctorial strength, and brilliant color. Their cost is low, but they have only fair light and heat resistance. Naphthol Reds have good resistance to water and light, but low resistance to thermal degradation. Para Reds are especially light-fast but have low brilliance and darken with heat. Toluidine pigments have high light resistance but only fair resistance to acids and alkalies. These pigments may bleed in oil. Rhodamine pigments have brilliant clean colors but generally low resistance to degrading influences.

As is apparent by the above discussion, most pigments have both desirable and undesirable characteristics. Thus, there is a continuing need for improved pigments having good resistance to degradation, good dispersing characteristics and brilliant, clean colors.

It is, therefore, an object of this invention to provide pigments which substantially overcome the above-noted deficiencies.

It is a further object of this invention to provide novel compositions having an intense red-magenta color.

It is a still further object of this invention to provide new pigmented coating and molding compositions.

It is another object of this invention to provide novel pigments having superior resistance to thermal and chemical degradation.

It is still another object of this invention to provide novel pigments having superior electrical photosensitive characteristics.

The foregoing objects and others are accomplished in accordance with this invention, basically, by providing novel compositions having the general formula:

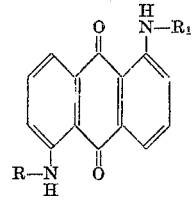

wherein: R and $R_1$ are each selected from the group consisting of alkyl, aryl, aralkyl and hetero substituted alkyl groups.

The compositions of the above general formula belong to the class of N-substituted 1,5-bis-amino anthraquinones. These compositions may be prepared by reacting 1,5-dichloro anthraquinone with any suitable amine. The 1,5-dinitroanthraquinone or anthraquinone-1,5-disulfonic acid may be used in place of 1,5-dichloro anthraquinone, if desired.

The compositions of the above general formula have in general the characteristics of an intense magenta color and of substantial insolubility in the common organic solvents, e.g., benzene, toluene, acetone, carbon tetrachloride, chloroform, alcohols, and aliphatic hydrocarbons, and these may be dispersed in the usual paint and ink vehicles without dissolving excessively.

Of the compositions within the above general formula, 1,5-bis-(3'-methoxypropylamino) anthraquinone, 1,5-bis-(β-phenylethylamino) anthraquinone and 1,5-bis-([p-nitro]-β-phenylethylamino) anthraquinone are preferred since they have an especially pure and brilliant color. In addition, these compositions have an especially high electrical photosensitivity.

The following examples further define methods of making the compositions of the present invention. Parts and percentages are by weight unless otherwise indicated. The examples below should be considered to illustrate various preferred embodiments of the invention.

EXAMPLE I

A mixture of about 8 parts of 1,5-dichloroanthraquinone, about 72 parts of 2-phenylethylamine, and about 0.2 part of copper dust is stirred and heated at about 135°–145° C. for about 18 hours. The deep red solution is allowed to cool to room temperature, and the precipitated product is filtered off and washed with ethanol. The product is recrystallized from about 100 parts of dimethyl formamide, yielding about 8 parts of dark magenta needles, melting at 203°–207° C. This product is 1,5-bis-(beta-phenylethylamino) anthraquinone. The yield here is approximately 60 percent.

The following table lists additional examples for synthesizing other compositions within the general formula given above by the technique described in Example I. The table lists in column 1, the number of the example, in column 2, the name of the product synthesized, in column 3, the particular amine which is reacted with 1,5-dichloro anthraquinone, column 4 lists the melting point of the product, and column 5 lists the percentage yield expected.

TABLE

| Product | | Amine | M.P., °C. | Yield, percent |
|---|---|---|---|---|
| Example: | | | | |
| II | 1,5-bis-(anilino) anthraquinone | Aniline | 236-239 | 65 |
| III | 1,5-bis-(cyclohexylamino) anthraquinone | Cyclohexylamine | 241-243 | 70 |
| IV | 1,5-bis-(benzylamino) anthraquinone | Benzylamine | 230-235 | 98 |
| V | 1,5-bis-(2'-pyridylethylamino) anthraquinone | 2-(beta-aminoethyl)-pyridine | 166-168 | 88 |
| VI | 1,5-bis-(beta-hydroxy-ethylamino) anthraquinone | Ethanolamine | 254-255 | 93 |
| VII | 1,5-bis-(beta-amino-ethylamino) anthraquinone | Ethylenediamine | 208-212 | 61 |
| VIII | 1,5-bis-(gamma-phenyl-propylamino) anthraquinone | Phenyl-propylamine | 179-181 | 26 |
| IX | 1,5-bis-(n-hexylamino) anthraquinone | n-Hexyl-amine | 124-129 | 79 |
| X | 1,5-bis-(p-nitrophenyl-ethylamino) anthraquinone | p-Nitro-phenylethylamine | 275-280 | 30 |
| XI | 1,5-bis-(phenylbutylamino) anthraquinone | 4-Phenyl-1-butylamine | 126-128 | 66 |
| XII | 1,5-bis-(3'-methoxy-propylamino) anthraquinone | 3-methoxy-propylamine | 122-123 | 71 |
| XIII | 1,5-bis-(phenyl iso-propylamino) anthraquinone | Delta-amphetamine | 170-172 | 50 |
| XIV | 1,5-bis-(beta-hydroxy-phenylethylamino) anthraquinone | Beta-hydroxy-phenylethylamine | 224-228 | 92 |
| XV | 1,5-bis-[N-(beta-aminoethyl) morpholino] anthraquinone | N-(beta-aminoethyl-morpholine) | 200-204 | 74 |

The compositions of this invention are especially useful as pigments for coloring paints, varnishes, and other coating and molding compositions. For such uses, the pigment must generally be in finely powdered form. The particles may be reduced to a fine powder, for instance, by dispersing the material in a hydrocarbon liquid and ball milling for about 48 hours.

The following examples further define typical uses for the compositions for the present invention.

EXAMPLE XVI

About 100 parts of 1,5-bis-(beta-phenylethylamino) anthraquinone having the structure:

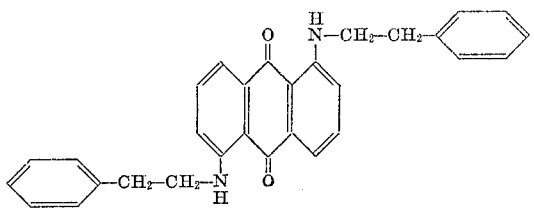

prepared as in Example I above, is gradually added to about 100 parts of a vinyl resin varnish, containing about 20 percent Vinylite XYHL, a vinyl resin available from Union Carbide Corporation, about 40 percent nitroethane and about 40 percent xylol, in a mixing vessel with mild agitation. After the pigment is uniformly dispersed in the carrier, the composition is coated onto a steel panel, as by brushing, spraying or dipping and air dried. Upon examination, the coated surface is found to have an intense, bright purple color and a hard durable surface.

EXAMPLE XVII

A pigmented coating composition is prepared as follows: About 50 parts of an N-butylmethacrylate-methacrylic acid interpolymer is dissolved in about 100 parts of toluene. The solution is milled in a ball mill with about 20 parts of 1,5-bis-(3'-methoxypropylamino) anthraquinone, having the structure:

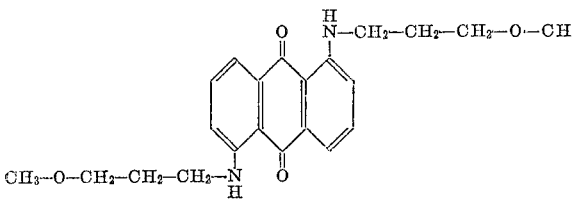

prepared as in Example XII above, until a uniformly pigmented composition is obtained. The resulting composition is applied to a clean metal surface, giving a smooth finish when air dried and after heating from 5 to 30 minutes at temperatures ranging from 80° to 200° C., gives finishes having high gloss, a brilliant dark magenta color and good flexibility and adhesion characteristics.

EXAMPLE XVIII

A pigmented polystyrene material suitable for use as a coating or molding composition is prepared as follows: A mixture of about 100 parts polystyrene and about 25 parts 1,5-bis-(beta-aminoethylamino) anthraquinone having the structure:

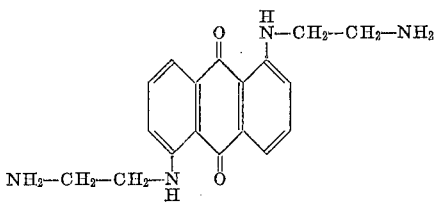

synthesized as in Example VII above is prepared by milling the ingredients on hot rolls for about 20 minutes at a temperature of about 170° to 200° C. This concentrate is removed from the rolls as a sheet, cooled and ground to a powder. About 2 parts of the ground concentrate and about 10 parts of polystyrene are dissolved in about 90 parts of a monomeric styrene and the mixture is poured into a cylindrical container. The container is placed in a heating chamber with its long axis in a vertical direction and the styrene is polymerized by heating at a temperature of about 90° C. for about 7 hours, then raising the temperature to about 200° C. and heating for about an additional 48 hours to complete the polymerization. After polymerization, the product is removed from the container as a single block of pigmented polystyrene and cut into sections. Inspection shows a uniform distribution of the insoluble pigment throughout the entire mass of polystyrene. The resulting bright magenta colored sheets of polystyrene may be useful as sheets, may be further reshaped into commercial products, or may be ground to a powder and molded by conventional molding techniques.

In addition to the specific uses listed in the above examples, it has been found that the compositions of this invention may be dispersed in other natural and synthetic resins resulting in colored compositions suitable for coating and molding processes. Any suitable carrier resin may be used. Typical resins include balsam resins, phenol resins, phenol resins modified with colophony and other resins, of which colophony constitutes a major part, coumarone resins and indene resins and the substances covered by the collective term "synthetic lacquer resins" which include processed natural substances, such as cellulose ether; polymers such as polyvinylchlorides, polyvinylacetate, polyvinylacetals, polyvinylethers, polyacrylic and polymethacrylic esters, polystyrene and isobutylene; polycondensates, e.g. polyesters such as phthalate resins, alkyd resins, maleic acid resins, phenolformaldehyde resins, ureaformaldehyde resins, melamine formaldehyde condensates, aldehyde resins, ketone resins, xylene formaldehyde resins, polyactams and polyamides; epoxy resins; polyadducts, such as polyurethanes and suitable mixtures or copolymers thereof.

The compositions of this invention are further useful as pigments in paper making processes when a magenta colored paper is desired. The pigments of this invention may also be dispersed in synthetic filament forming materials useful in the production of synthetic textiles. The compositions have further uses in certain insecticides, serbicides and fungicides. The electrically photosensitive characteristics of these compounds, i.e. their ability to hold an electrostatic charge in the dark and dissipate it in the light, makes them also useful in various electrophotographic imaging processes. The compositions and/or magenta pigments of this invention may have other materials mixed therewith to enhance, synergize, or otherwise modify their properties.

Although specific materials and conditions were set forth in the above exemplary processes of making and using the compounds of this invention, these were merely meant as illustrations of the present invention. Various other carriers, substituents and uses such as those listed above, and various conditions may be substituted for those in the examples with similar results. Many other modifications of the present invention will occur to those skilled in the art upon reading the present disclosure. These are intended to be encompassed within the spirit of this invention.

What is claimed is:
1. 1,5 - bis - (3' - methoxypropylamino) - anthraquinone.
2. 1,5 - bis - [2' - (p - nitrophenyl) - ethylamino]-anthraquinone.

References Cited

UNITED STATES PATENTS

| | | | |
|---|---|---|---|
| 2,051,004 | 8/1936 | Koeberle et al. | 260—378 |
| 2,051,005 | 8/1936 | Koeberle et al. | 260—378 |
| 2,848,462 | 8/1958 | Gutzmiller | 260—378 |
| 3,173,929 | 3/1965 | Kasman | 260—378 |

OTHER REFERENCES

Beilstein: Handbuch Org. Chem., vol. 14, Berlin, Julius Springer, pp. 205–206.

Beilstein: Handbuch Arg. Chem. (first supplement), vol. 14, Berlin, Julius Springer, p. 468 (1933).

LORRAINE A. WEINBERGER, Primary Examiner

HAROLD C. WEGNER, Assistant Examiner

U.S. Cl. X.R.

96—1.5; 106—15, 22, 193; 117—132, 161, 166; 260—37, 38, 39, 40, 41, 247.5, 272